3,224,893
POLYAMIDES OF IMPROVED SOLUBILITY FROM POLYALKYLENE POLYAMINES, HYDROXY MONOCARBOXYLIC ACID, AND HYDROCARBON POLYMERIC FAT ACIDS
Don E. Floyd, Robbinsdale, and David W. Glaser, St. Paul, Minn., assignors to General Mills, Inc., a corporation of Delaware
No Drawing. Filed Sept. 10, 1962, Ser. No. 222,651
10 Claims. (Cl. 106—316)

This invention relates to polyamide resins and solutions thereof suitable for use in flexographic ink vehicles and in particular to alcohol solutions of polyamides obtained by reacting a mixture comprising polymeric fat acids, alkylene polyamines, and a hydroxy monobasic carboxylic acid.

Flexographic inks are solvent based inks applied by rollers or pads to flexible sheets of plastic, foil, and paper. A number of generally applicable and acceptable resin binders are available for flexographic inks. These exhibit varying degrees of solubility in alcoholic solvents —some are quite soluble at room temperature in denatured ethanol, others are significantly less soluble. Of particular interest to those working in the flexographic ink field would be a resin binder combining the generally acceptable properties of the available binders with markedly improved solubility in alcohol-based solvents. Certain applications require a high level of solubility in a standard denatured ethanol (no hydrocarbon).

One of the drawbacks of materials currently available in this field is their low temperature solubility characteristics. A number of resin binders are available which exhibit generally good solubility in denatured ethanol as long as the solution is maintained at or above room temperature. However, these materials, when cooled to any extent below room temperature, gel and/or separate into two phases, and once gelled or separated they will not return to fluidity and/or homogeneity upon rewarming to room temperature unless external heating and stirring is provided. Obviously, this is a distinct disadvantage in the preparation, handling, and use of an ink binder.

An object of this invention is to provide polyamides suitable as flexographic ink binders. It is a further object to provide polyamides with markedly improved low temperature solubility in alcohol solvents. Other objects will appear hereinafter.

The polyamides of the present invention are prepared by reacting principally polymeric fat acids, an alkylene polyamine, and a hydroxy monobasic acid. Reaction conditions for the preparation of the polyamide resins may be varied widely. Generally the reaction is carried out at a temperature within the range of about 150-250° C. Preferably the reaction is carried out at about 200° C. The time of reaction may also be varied widely and will depend somewhat on temperature. Normally a time period of 3 to 8 hours after reaching the selected temperature is required. The preferred time of reaction is about 5 hours. A typical set of reaction conditions is 205° C. for a period of 5 hours. Vacuum may be applied if desired to withdraw volatile by-products and to keep the resin mixture from contact with air which may cause darkening. An inert gas may also be employed to avoid contact with air.

The hydroxy monobasic carboxylic acids of the present invention are those of the general formula

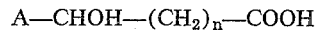
A—CHOH—(CH$_2$)$_n$—COOH where $n$ is an integer from 0 to 3, and A may be hydrogen or a short chain branched or straight chain aliphatic radical, an aryl radical, an alkaryl radical, or an aralkyl radical. Typicl hydroxy monobasic acids contemplated are: glycolic acid, lactic acid, β-hydroxypropionic acid, α-hydroxy-n-caproic acid, β-methylpropylhydracrylic acid, tetramethyl-hydracrylic acid, β-hydroxy-α-diethylbutyric acid, salicylic acid, phenylglycolic acid, and phenyllactic acid.

The alkylene polyamines which may be employed are those having the formula

H$_2$N(R'NH)$_n$H where R' is an alkylene radical having from 2 to 3 carbon atoms, and $n$ is an integer from 1 to 4. Illustrative thereof are ethylenediamine, propylene diamine, diethylene triamine, triethylene tetramine, and the like. The amines of the reaction compositions of the present invention may be used singly or in mixtures, but the ethylene or propylene diamine content of any such mixture should account for at least half of the polyalkylene polyamine employed, and preferably the ethylene or propylene diamine content should represent three quarters of the amine groups present.

Preferably, the polyamides of this invention are prepared with the equivalents of amine groups employed being substantially equivalent to the equivalents of carboxylic group employed.

The polymeric fat acids which may be employed in preparing the polyamides are those resulting from the polymerization of drying or semi-drying oils or the free fat acids or the simple alcohol esters of these fat acids. The term "fat acids" is intended to include saturated, ethylenically unsaturated and acetylenically unsaturated naturally occurring and synthetic monobasic aliphatic acids containing from 8–24 carbon atoms. The term "polymeric fat acid" refers to polymerized fat acids. The term "polymeric fat radical" refers to the hydrocarbon radical of a polymerized fat acid, and is generic to the divalent, trivalent, and other polyvalent hydrocarbon radicals of dimerized fat acids, trimerized fat acids and higher polymers of fat acids. The divalent and trivalent hydrocarbon radicals are referred to herein as "dimeric fat radical" and "trimeric fat radical" respectively.

The saturated, ethylenically unsaturated, and acetylenically unsaturated fat acids are generally polymerized by somewhat different techniques, but because of the functional similarity of the polymerization products, they all are generally referred to as "polymeric fat acids."

Saturated fat acids are difficult to polymerize but polymerization can be obtained at elevated temperatures with a peroxidic catalyst such as di-t-butyl peroxide. Because of the generally low yields of polymeric products, these materials are not currently significant. Suitable saturated fat acids include branched and straight acids such as caprylic acid, pelargonic acid, capric acid, lauric acid, myristic acid, palmitic acid, isopalmitic acid, stearic acid, arachidic acid, behenic acid, and lignoceric acid.

The ethylenically unsaturated acids are much more readily polymerized. Catalytic or non-catalytic polymerization techniques can be employed. The non-catalytic polymerization generally requires a higher temperature. Suitable catalysts for the polymerization include acid or alkaline clays, di-t-butyl peroxide, boron trifluoride and other Lewis acids, anthraquinone, sulfur dioxide and the like. Suitable monomers include the branched straight chain, poly and mono ethylenically unsaturated acids such as 3-octenoic acid, 11-dodecenoic acid, linderic acid, lauroleic acid, myristoleic acid, tsuzuic acid, palmitoleic acid, petroselinic acid, oleic acid, elaidic acid, vaccenic acid, gadoleic acid, cetoleic acid, nervonic acid, linoleic acid, linolenic acid, eleostearic acid, hiragonic acid, moroctic acid, timnodonic acid, eicosatetraenoic acid, nisinic acid, scoliodonic acid and chaulmoogric acid.

The acetylenically unsaturated fat acids can be polymerized by simply heating the acids. Polymerization of these highly reactive materials will occur in the absence of a catalyst. The acetylenically unsaturated acids occur only rarely in nature and are expensive to synthesize. Therefore, they are not currently of commercial significance. Any acetylenically unsaturated fat acid, both straight chain and branched chain, both mono-unsaturated and poly-unsaturated, are useful monomers for the preparation of the polymeric fat acids. Suitable examples of such materials include 10-undecenoic acid, tariric acid, stearolic acid, behenolic acid, and isamic acid.

Because of their ready availability and relative ease of polymerization, oleic and linoleic acid are the preferred starting materials for the preparation of the polymeric fat acids.

Typical compositions of commercially available polymeric fat acids based on unsaturated $C_{18}$ fat acids are:

| | Percent by weight |
|---|---|
| $C_{18}$ monobasic acids | 5–15 |
| $C_{36}$ dibasic acids | 60–80 |
| $C_{54}$ (and higher) tribasic acids | 10–35 |

These mixtures may be fractionated by suitable means such as high vacuum distillation or solvent extraction techniques so as to obtain dimer acid cuts of higher concentration where necessary. For the purposes of the polyamides of the present invention, the monomeric fat acids content can vary over a fairly wide range, as low as 1–5% and as high as 15–20%.

The ratio of polymeric fat acids to hydroxy monobasic acids employed may vary over a considerable range. In general, compositions containing in the range of about 10 equivalent percent to about 35 equivalent percent of hydroxy monobasic acids have satisfactory melting points and solubilities. Compositions containing substantially less than 10 equivalent percent hydroxy monobasic acids are found to exhibit relatively poor alcohol solubility. Compositions containing much more than 35 equivalent percent hydroxy monobasic acids of the total of carboxylic acids tends to lose the desirable characteristics of toughness, adhesion, and chemical resistance.

Where specialized characteristics are desired, the compositions of the present invention can be modified by including other components in the reaction mixture; other carboxylic acids, low aliphatic monobasic acids (e.g., acetic acid and propionic acids), and/or low aliphatic dicarboxylic acids (e.g., azelaic acid). These acids will serve as modifiers affecting melting point and other characteristics.

The polyamides of the present invention exhibiting the desired high degree of low temperature solubility in denatured ethanol comprise those polyamides prepared from alkylene polyamines, polymeric fat acids, hydroxy monobasic acids, and minor proportions of other aliphatic acids wherein total carboxylic functionality (derived from the polymeric fat acids, the hydroxy monobasic acids, and any modifying carboxylic acids present) is maintained essentially equal to the amine functionality. That is, for every equivalent of amine groups, essentially one equivalent of carboxylic groups is employed. Polymeric fat acids and hydroxy monobasic acids comprise at least 90% of the carboxylic acid groups present, the ratio of polymeric fat acid carboxylic groups to hydroxy monobasic acid carboxylic groups being in the range of 88:12 and 65:35, on an equivalents basis.

The solubility characteristics of the compositions of the present invention were determined by observing 35% solids solutions of the polyamides in a suitable solvent. Since at present, most flexographic presses have natural rubber rollers which are attacked or softened by a large variety of solvents including solvents such as aromatic and aliphatic hydrocarbons, ketons, and esters, the solvents employed in this invention are those which do not attack rubber. Such solvents are alcohols having the formula R″OH where R″ is an aliphatic hydrocarbon radical having from 2 to 5 carbon atoms, such as ethanol, normal propanol, isopropanol, and butanol. Blends of these same alcohols with small amounts of other solvents such as aliphatic hydrocarbons and esters may be used where they can be tolerated, particularly if special synthetic rubber plates are to be used. Typical ink binders are employed as solutions of from about 25% to about 50% resin based on the total weight of solution. In addition, from about 0.1 to 6% water based on the total weight of solution may be present in the solvent in many cases. Since the most important single feature of the polyamide compositions of the present invention is their alcohol solubility and since denatured ethanol is the preferred alcohol, the solubility characteristics of our compositions were determined by observation of 35% solids solutions in denatured ethanol (Filmex 1 Regular, U.S.I. Industrial Chemicals Co.: ethyl alcohol, 81.5%; isopropyl alcohol, 9.0%; methyl alcohol, 4.3%; water, 4.3%; methyl isobutyl ketone, 0.9%). Solubility observations were made at two temperatures, 73° F. and 40° F. In addition, the recovery from gellation on warming from 40° F. was observed. All the compositions of the present invention were completely soluble at 73° F. in denatured ethanol at 35% solids. The solutions remained clear and fluid indefinitely during storage at 73° F. When chilled to 40° F., all the 35% solids solutions gelled. However on being returned to the 73° F. environment, the solutions quickly liquified and become homogeneous.

Our co-pending application, entitled Polyamides of Improved Melting Point and Increased Solubility for Ink Binders, application Serial No. 222,652, filed on even date herewith, covers the modification of polyamides of this general type with low aliphatic monobasic carboxylic acids. The modification with low aliphatic monobasic acids markedly improves the room temperature solubility of high concentration of the modified polyamide in denatured ethanol. However, the low temperature solubility of those low aliphatic monobasic carboxylic acid modified polyamides is relatively poor. On cooling to 40° F. a more or less stable gel is produced which will not liquify and become homogeneous on simply rewarming to room temperature. On the other hand, the denatured ethanol solutions of the compositions of the present invention, although they also gel at 40° F., do return quickly to a homogeneous liquid state on allowing to return to room temperature.

Melting points (softening points) of the polyamide resins of the present invention were measured by conventional "ball and ring" melting point determinations, ASTM E28–58T.

The invention can further be illustrated by the following examples in which the polymeric fat acids are polymerized tall oil fatty acids and in which all parts and percentages are by weight unless specifically noted otherwise. The following examples are intended to be illustrative and not limiting on the scope of the invention.

Example I

A polyamide polymer was prepared as follows. A mixture of 0.80 gram equivalent (224 g.) of polymerized fat acids, 0.20 gram equivalent (18 g.) of lactic acid, and 0.98 gram equivalent (29.4 g.) of ethylene diamine was charged into a 3-neck flask fitted with thermometer, mechanical stirrer and distilling column and head. The mixture was stirred and heated to 100° C. and then more slowly to 140° C. At this point the by-product water began to distill over and the temperature rise had to be controlled carefully to avoid foaming. The temperature was raised to 200° C. while water continued to distill out. Reaction at 200° C. was continued for four hours, the last hour under reduced pressure of about 15 to 20 mm. The vacuum was released at about 175° C. The product was removed from the flask and cooled. A hard, solid, amber-colored resin was obtained.

Ball and ring softening point _____° C__ 96
Acid number _____ 5.6
Amine number _____ 7.7

The resin was completely soluble in denatured ethanol at 35% solids and at 40% solids at room temperature. When the solutions were cooled to 40° F., a jelly-like mass was obtained, but this quickly converted to a free-flowing homogeneous liquid when it was warmed to room temperature.

Example II

Using the procedure of Example I, the following polyamide compositions were perpared as products representative of the present invention and as comparative controls.

| Prep. | Equivalents polymerized fat acids | Modifying acid | | Equivalents ethylene diamine | Equivalents diethylene triamine |
|---|---|---|---|---|---|
| | | Type | Equiv. | | |
| Control | 1.0 | | | 1.0 | |
| Comparative-A | .777 | Acetic | .223 | 1.0 | |
| Comparative-B | .833 | ___do___ | .167 | .90 | .10 |
| Comparative-C | .77 | {Acetic / Lactic | .18 / .05 | .90 | .10 |
| Comparative-D | .70 | {Acetic / Azelaic | .223 / .077 | .90 | .10 |
| II-1 | .80 | Lactic | .20 | .98 | |
| II-2 | .75 | ___do___ | .25 | .98 | |
| II-3 | .77 | {Lactic / Azelaic | .22 / .01 | .98 | |
| II-4 | .77 | {Acetic / Lactic | .05 / .18 | .98 | |
| II-5 | .73 | {Azelaic / Lactic | .03 / .24 | .98 | |
| II-6 | .75 | Butyrolactone. | .25 | .98 | |
| II-7 | .77 | {Acetic / Lactic | .10 / .13 | .98 | |
| II-8 | .70 | {Azelaic / Lactic | .077 / .223 | .98 | |
| II-9 | .833 | Glycolic | .167 | .90 | .10 |
| II-10 | .70 | Lactic | .30 | .98 | |
| II-11 | .90 | ___do___ | .10 | .98 | |
| II-12 | .67 | {Lactic / Acetic | .28 / .05 | .98 | |

The preparations outlined above had the following properties:

| Prep. | Softening point, ° C. | Amine number | Acid number | Solubility at 35% solids in denatured ethanol | |
|---|---|---|---|---|---|
| | | | | 73° F., days to gel | Rewarm from 40° F., minutes to clear |
| Control | 110 | 4.1 | 3.9 | Insol. | |
| Comparative-A | 131.2 | 2.8 | 3.2 | 14 | (¹) |
| Comparative-B | 120 | 4.4 | 3.7 | Insol. | |
| Comparative-C | 119.6 | 7.0 | 6.1 | >42 | (³) |
| Comparative-D | 131.4 | 6.4 | 5.7 | ²>24 | (⁴) |
| II-1 | 96.2 | 5.6 | 7.7 | ²>38 | 75 |
| II-2 | 95.7 | 6.1 | 8.3 | ²>33 | 60 |
| II-3 | 97.5 | 5.2 | 6.4 | ²>28 | 90 |
| II-4 | 101.5 | 4.0 | 6.9 | ²>28 | 120 |
| II-5 | 98.3 | 5.6 | 6.0 | ²>20 | 90 |
| II-6 | 90.4 | ⁵32.6 | 2.3 | ²>10 | 45 |
| II-7 | 110.5 | 4.9 | 7.1 | ²>6 | 120 |
| II-8 | 125.0 | 4.7 | 9.0 | ²>5 | 60 |
| II-9 | 116.1 | 7.6 | 3.7 | ²>41 | ⁶90 |
| II-10 | 107 | 5.9 | 6.0 | ²>12 | 40 |
| II-11 | 104.2 | 7.0 | 6.1 | Insol. | |
| II-12 | 105 | 9.0 | 6.5 | ²>9 | 40 |

¹ Does not clear.
² Day at which observation stopped (days to gel much greater in most cases).
³ Recovers in 1 day.
⁴ Does not recover.
⁵ Lactone distills out during reaction.
⁶ Solubility tested in 90 parts denatured ethanol 10 parts n-propanol.

Example III

A varnish for a flexographic ink was prepared by dissolving the polyamide of Example I in denatured ethanol to give a 35% solids solution. The varnish was tested for properties important to the flexographic ink industry.

| | |
|---|---|
| Sward hardness | 14. |
| Tack-free time, 1.5 mil wet film | 4 minutes. |
| Gloss on label paper, 1.5 mil wet film (Gardner 60°) | 73. |
| Percent extensibility, G.E. impact-flexibility tester | 40%. |
| Compatibility test, 70/30 ratio, by weight with S.S., ¼ second, nitrocellulose | Compatible. |

Example IV

A white flexographic ink was prepared by grinding together in a pebble mill: 40 parts of the resin of Example II–4, 60 parts of denatured ethanol, and 40 parts of a rutile titanium oxide pigment. The resultant finely ground ink had a Stormer viscosity of 60 KU. A half mil thick wet coat when dried on treated polyethylene sheet had a gloss of 68 measured with the Gardner 60° glossmeter and showed no loss of adhesion when tested with cellophane tape. The ink was completely fluid after storage in an airtight container for at least 28 days at 73° F.

The embodiments of the present invention in which an exclusive property or privilege is claimed are defined as follows:

1. A polycarbonamide composition comprising the condensation product of (A) polyalkylene polyamines of the general formula $$H_2N(R'NH)_nH$$

where R' is an alkylene radical having from 2–3 carbon atoms and $n$ is an integer from 1–4 with at least one-half of the polyamines employed being those in which $n$ is 1, (B) a hydroxy monocarboxylic acid selected from the group consisting of lactic, glycolic, β-hydroxypropionic, α-hydroxy-n-caproic, β-methylpropylhydracrylic, tetramethylhydracrylic, β-hydroxy-α-diethylbutyric, salicylic, phenylglycolic and phenylacetic acids, and (C) hydrocarbon polymeric fat acids; the equivalents of amine groups being substantially equivalent to the equivalents of carboxylic groups employed, where at least 90 equivalent percent of the carboxylic groups employed are derived from the polymeric fat acids and the hydroxy monocarboxylic acids, with the equivalent carboxyl group ratio of polymeric fat acids to hydroxy monocarboxylic acids being in the range of 88:12 to 65:35.

2. A polycarbonamide composition as defined in claim 1 in which said hydroxy monocarboxylic acid is lactic acid.

3. A polycarbonamide composition as defined in claim 1 in which said hydroxy monocarboxylic acid is glycolic acid.

4. A polycarbonamide composition as defined in claim 1 and further comprising from 2–10 equivalent percent of acetic acid.

5. A polycarbonamide composition as defined in claim 1 and further comprising from 2–10 equivalent percent of propionic acid.

6. A polycarbonamide composition as defined in claim 1 and further comprising from 2–10 equivalent percent of azelaic acid.

7. A polycarbonamide composition as defined in claim 4 in which the acetic acid content is 5 equivalent percent, the polymeric fat acid content is 77 equivalent percent and the hydroxy monocarboxylic acid is lactic acid employed in an amount of 18 equivalent percent.

8. A solution of the condensation product of (A) polyalkylene polyamines of the general formula $$H_2N(R'NH)_nH$$

where R' is an alkylene radical having from 2–3 carbon atoms and $n$ is an integer from 1–4 with at least one-half of the polyamines employed being those in which $n$ is 1, (B) a hydroxy monocarboxylic acid selected from the group consisting of lactic, glycolic, β-hydroxypropionic, α-hydroxy-n-caproic, β-methylpropylhydracrylic, tetramethylhydracrylic, β-hydroxy-α-diethylbutyric, salicylic, phenylglycolic and phenylacetic acids, and (C) hydrocarbon polymeric fat acids; the equivalents of amine groups being substantially equivalent to the equivalents of carboxylic groups employed, where at least 90 equivalent percent of the carboxylic groups employed are derived from the polymeric fat acids and the hydroxy monocarboxylic acids, with the equivalent carboxyl group ratio of polymeric fat acids to hydroxy monocarboxylic being in the range of 88:12 to 65:35.

9. A solution as defined in claim 8 in which the alcoholic solvent is denatured ethanol.

10. A flexographic ink binder consisting essentially of a solution of the condensation product of (A) polyalkylene polyamines of the general formula $$H_2N(R'NH)_nH$$

where R' is an alkylene radical having from 2–3 carbon atoms and $n$ is an integer from 1–4 with at least one-half of the polyamines employed being those in which $n$ is 1, (B) a hydroxy monocarboxylic acid selected from the group consisting of lactic, glycolic, β-hydroxypropionic, α-hydroxy-n-caprioic, β-methylpropylhydracrylic, tetramethylhydracrylic, β-hydroxy-α-diethylbutyric, salicylic, phenylglycolic and phenylacetic acids, and (C) hydrocarbon polymeric fat acids; the equivalents of amine groups being substantially equivalent to the equivalents of carboxylic groups employed, where at least 90 equivalent percent of the carboxylic groups employed are derived from the polymeric fat acids and the hydroxy monocarboxylic acids, with the equivalent carboxyl group ratio of polymeric fat acids to hydroxy monocarboxylic acids being in the range of 88:12 to 65:35.

References Cited by the Examiner
UNITED STATES PATENTS

| | | | |
|---|---|---|---|
| 2,174,527 | 10/1939 | Peterson | 260—78 |
| 2,379,413 | 7/1945 | Bradley | 260—18 |

WILLIAM H. SHORT, *Primary Examiner.*

J. R. LIBERMAN, *Examiner.*